Patented Mar. 8, 1949

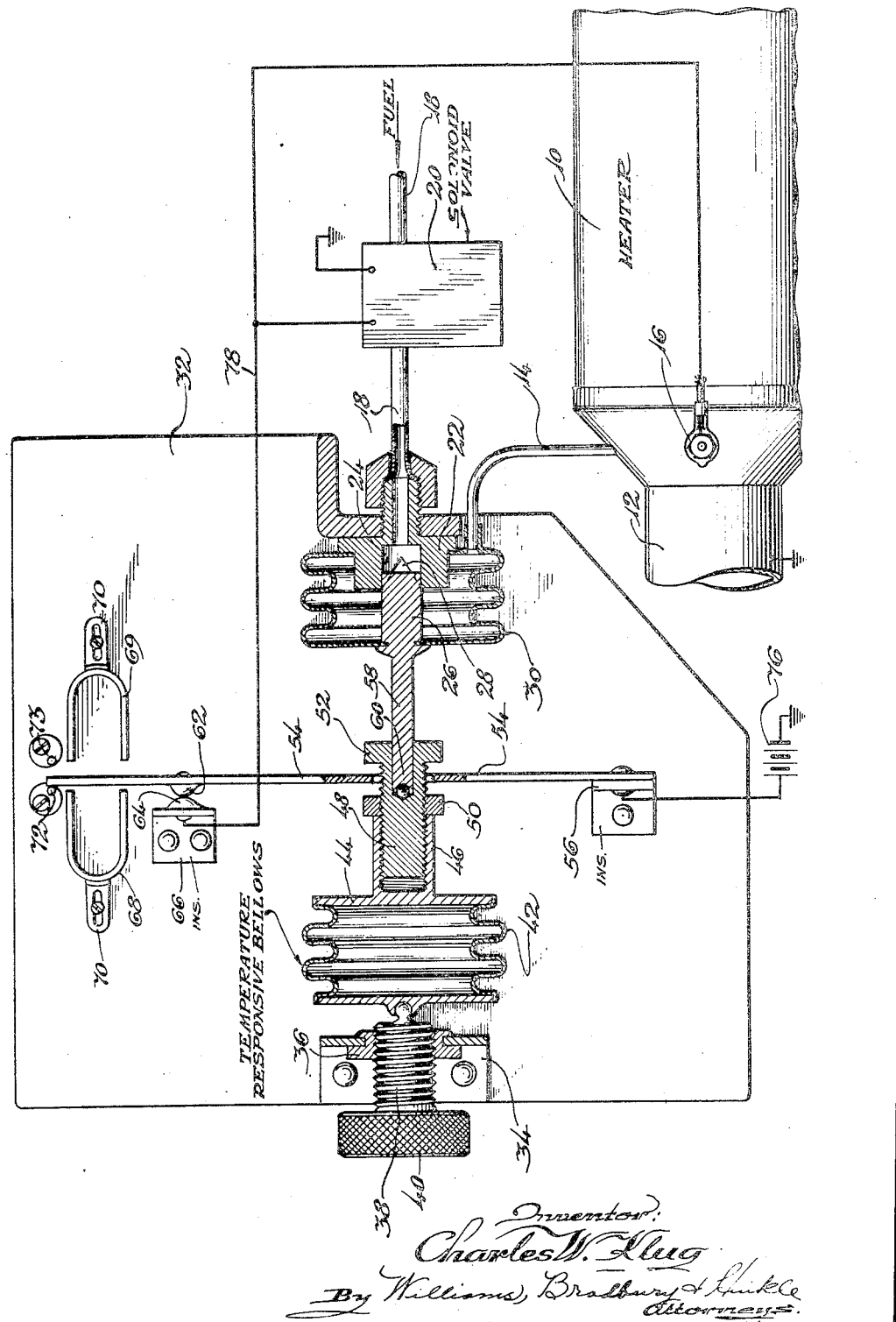

2,463,699

UNITED STATES PATENT OFFICE 2,463,699

CONTROL APPARATUS

Charles W. Klug, Chicago, Ill., assignor to Stewart-Warner Corporation, Chicago, Ill., a corporation of Virginia Application December 14, 1944, Serial No. 568,183

3 Claims. (Cl. 236—1)

1

My invention relates generally to control apparatus, and more particularly to temperature responsive apparatus for the control of heaters.

In utilizing liquid fuel burning heaters, particularly those of the internal combustion type for the heating of an enclosed space, it is desirable to provide means for modulating the fuel supply to the heater in response to the temperature of the air in the space being heated. By modulating the fuel supply rather than having the heater turned on and off intermittently, a more uniform temperature may be maintained. However, a modulating system of conventional construction is not adapted for control of heaters of the internal combustion type, since it is desirable that upon starting heaters of this type, the fuel-air mixture shall be relatively rich in order to assure prompt ignition.

It is therefore an object of my invention to provide an improved control apparatus for liquid fuel burning heaters, particularly of the internal combustion type, in which the rate of fuel supply is modulated in response to changes in temperature of the space being heated, and in which provision is made for assuring an adequately rich fuel-air mixture for the heater during starting.

It is a further object of my invention to provide an improved fuel flow regulating valve mechanism which is capable also of controlling the electrical energization of the heater.

Other objects will appear from the following description, reference being had to the accompanying drawing which diagrammatically illustrates the control apparatus having a schematic wiring diagram superposed thereon.

The heater is diagrammatically illustrated as comprising a casing 10 having a ventilating air inlet duct 12, a fuel supply pipe 14, and an electric terminal 16.

Fuel for the operation of the heater is obtained from a suitable source under pressure through a pipe 18, the flow through this pipe being controlled by an on-off solenoid valve 20, the valve being so arranged that it is open while current is being supplied to its solenoid and closed by spring pressure when the current supply is cut off. The pipe 18 is suitably connected to a valve body 22 having a cylindrical bore 24 for the reception of a cylindrical plunger valve 26. The wall of the valve body 22 is provided with a V-shaped metering notch 28 which is more or less covered by the cylindrical valve 26. A flexible resilient bellows 30 forms a seal between the valve body 22 and the cylindrical valve 26. The fuel admitted through the pipe 18 and escaping from

2 the valve body through the metering notch 28 flows into the body of the bellows and thence to the heater through the pipe 14 which is suitably connected to the interior of the bellows 30.

The valve body 22 is suitably secured to a mounting plate 32. A bracket 34, having a nut 36 swaged thereto, is secured to the mounting plate 32. An adjusting screw 38 having a knob 40 is threaded in the nut 36 and is secured to one end plate of a temperature responsive bellows 42. This bellows may be partially filled with propane or similar chemical.

The other end plate 44 of the bellows 42 has an internally threaded boss 46 formed integrally therewith, or secured thereto, for the reception of an adjusting screw 48, which is held in adjusted position by a lock nut 50. The nut 50 and the head 52 of the screw 48 form adjustable actuators for a reed-like contact armature 54, the lower end of which is secured to the mounting plate by a bracket 56. The adjusting screw 52 is preferably drilled to receive the end 58 of the cylindrical valve 26, an anti-friction bearing 60 being preferably interposed between the end of the stem 58 and the bottom of the drilled hole in the adjusting screw 48 so that upon rotation of the adjustment knob 40, the bellows 42 together with the adjusting screw 48, may be rotated freely relative to the stem 58. In lieu of this arrangement, the end 58 may be fixed to the screw 48, and the connection between the screw 38 and the bellows 42 made to act as a swivel.

The armature 54 has a contact 62 for cooperation with a fixed contact 64 which is secured to the mounting plate 32 by an insulating bracket 66. A pair of horseshoe magnets 68 and 69 is adjustably mounted on the mounting plate 32 by means of brackets 70 so as to have their poles lie on opposite sides of the armature 54. In order to prevent the armature from flexing and freezing against the poles of the permanent magnets 68 and 69, there is provided a pair of stop discs 72, 73, which are eccentrically mounted so that adjustment in the effective stop positions thereof may be made.

Assuming a heater 10 of given capacity, it is desirable to have the fuel combustion rate variable between 250 milliliters per hour and 2000 milliliters per hour. Since the heater 10 may fail to operate properly when supplied with fuel at a rate lower than 250 milliliters per hour, it is desirable completely to shut off the heater when the ambient or room temperature rises to values such that the valve 26 reduces the flow to a rate of less than 250 milliliters per hour. This is accomplished by means of the solenoid valve 20, as will presently appear.

The position of the temperature responsive bellows 42 is adjusted by means of the knob 40 such that the heater will be turned off at any desired room temperature between 60 F. and 90 F. Assume, for example, that the knob 40 is adjusted for a room temperature of 70 F. in the space being heated by the heater 10, and that the ambient temperature is 65 F. Under these circumstances, the parts will be generally in the position shown in the drawing, and a substantial portion of the notch 28 in the valve body 22 will be uncovered by the cylindrical valve 26. The contacts 62, 64 will be closed, the solenoid valve 20 energized, and current supplied to the heater 10 to maintain it in operation. As the heater raises the room temperature, the bellows 42 will expand, forcing the cylindrical valve 26 to the right and decreasing the effective size of the notched opening 28.

The notched opening 28 is of triangular shape to compensate for the non-linear characteristic of the bellows 42, as well as for the fact that the bellows 30 offers increased resistance to compression as it is collapsed. As the temperature of 70 F. is approached, the effective area of the notched opening 28 will be decreased to a size such that the rate of fuel flow therethrough will be in the order of 250 milliliters per hour. At this time further expansion of the bellows 42 will be arrested by the engagement of lock nut 50 with the reed armature 54. If it were not for the operation of the switch means, presently to be described, and if the ambient temperature continued to rise above 71 F., it is apparent that the flow of fuel to the heater might be reduced to such low value that the operation of the heater would become erratic and would in all probability have its flame extinguished, due to the extreme leanness of the fuel mixture supplied to it.

To avoid this possibility, the magnet 68, due to the attraction of the end of the armature 54 thereto stops further closing movement of the valve 26 until the pressure within the bellows 42 has increased sufficiently to overcome the magnetic attraction of the permanent magnet 68. Adjustments are made so that this will occur when the ambient temperature is at 71 F., under the conditions initially assumed. When the reed armature 54 is forced from the immediate field of the permanent magnet 68, it will snap over into the position in which it engages stop 73 and is held in the strong field of the permanent magnet 69, thereby opening the contacts 62 and 64 to deenergize the solenoid valve 20.

The circuit for energizing the solenoid valve may be traced from the ungrounded terminal of a battery 76 (representative of any suitable source of electrical energy), the reed armature 54, contacts 62, 64, conductor 78, through the winding of the valve solenoid 20 to ground. The conductor 78 is also connected to the heater 10 to supply electrical energy for the operation of the latter, and it will be apparent from the wiring diagram that the heater 10 is deenergized simultaneously with the deenergization of the solenoid valve 20. As soon as the contacts 62, 64 separate, the solenoid valve 20 closes, thus shutting off the supply of fuel to the heater 10. Thus, even though the ambient temperature should rise above 71 F., the supply of fuel to the heater would be completely interrupted, the heater circuits deenergized, and hence the heater would be rendered inoperative.

Upon reduction in ambient temperature, the head 52 of the adjusting screw 48 is arranged to engage the reed armature 54, but due to the magnetic attraction of the permanent magnet 69, the armature 54 will not immediately swing to the left, but the ambient temperature will have to drop to a value (under the assumed conditions) of 69 F., before the force applied to the armature 54 will be sufficient to overcome the magnetic attraction of the permanent magnet 69 to permit the armature to snap over to the position in which it is shown in the drawing, in which position it will be held by the magnetic attraction of the permanent magnet 68. This arrangement assures that the uncovered portion of the triangular notch 28 will be sufficiently large, at all times when the solenoid valve 20 is open, to assure the supply of a sufficiently rich fuel mixture to the heater 10 to enable the latter to ignite promptly and burn continuously.

From the foregoing it will appear that I have devised a novel form of control apparatus for heaters and the like, in which the supply of fuel to the heater is so controlled that a certain minimum rate of fuel flow is maintained whenever the room temperature is such as to require heat from the heater. Further, it will be apparent that as the ambient temperature decreases from the predetermined temperature for which the apparatus has been adjusted, the fuel will not commence to flow immediately, but that the commencement of fuel flow will be deferred until the modulating control valve has opened sufficiently to assure an adequate supply of fuel for starting the heater.

In the foregoing description, it has been assumed that the fuel burned by the heater is in liquid form. This is not essential, since the apparatus may be readily used for the control of gaseous fuels as well as liquid fuels.

In most installations the control will seldom operate to open the contacts 62, 64, but instead the valve 26 will be automatically adjusted to a position in which the heat output of the heater will be just sufficient to compensate for the heat losses from the room or space being heated.

If desired the valve port 28 could be made of a shape which would cause it to be completely covered by the valve 26 after the latter has snapped to the right due to the rise of the ambient temperature above the predetermined high limit. If the valve is made to operate in this manner, the solenoid valve 20 may be omitted.

While I have shown and described particular embodiment of my invention, it will be apparent that numerous variations and modifications thereof may be made without departing from the underlying principles of the invention. I therefore desire, by the following claims, to include within the scope of my invention all such variations and modifications by which substantially the results of my invention may be obtained through the use of substantially the same or equivalent means.

I claim:

1. In an apparatus for controlling the flow of fuel to a fuel burning heater, the combination of a temperature responsive bellows located in the space heated by the heater, a variable aperture valve operated by said bellows and controlling the rate of fuel flow to the heater, an on-off electromagnetically operated valve for controlling the fuel flow to the heater, a switch element having a part of magnetic material forming an armature, a pair of permanent magnets located on opposite sides of said armature, means to prevent said armature from sticking to said magnets, interengaging means between said switch element, variable aperture valve and said temperature responsive bellows whereby the latter may move the armature of the switch element from the dense field of one of said magnets and into the dense field of the other of said magnets when a predetermined temperature is exceeded, said interengaging means arresting operation of said valve in a closing direction at minimum valve opening when the predetermined temperature is approached, and means operated by said switch element to cause deenergization of said solenoid operated valve and heater when a predetermined temperature is exceeded, and to cause reenergization of said solenoid valve and heater only when the ambient air temperature drops substantially below said predetermined temperature.

2. In an apparatus for controlling the flow of fuel to a fuel burning heater, the combination of a temperature responsive bellows located in the space heated by the heater, a variable aperture valve operated by said bellows and controlling the rate of fuel flow to the heater, an on-off electromagnetically operated valve for controlling the fuel flow to the heater, a switch element having a part of magnetic material forming an armature, a pair of permanent magnets located on opposite sides of said armature, lost motion interengaging means between said switch element, variable aperture valve and said temperature responsive bellows whereby the latter may move the armature of the switch element from the dense field of one of said magnets and into the dense field of the other of said magnets when a predetermined temperature is exceeded, said interengaging means arresting operation of said valve in a closing direction at minimum valve opening when the predetermined temperature is approached, and means controlled by said switch element to cause deenergization of said solenoid operated valve and heater when the predetermined temperature is exceeded and to cause reenergization of said solenoid valve and heater only when the ambient air temperature drops substantially below said predetermined temperature.

3. In a fuel flow rate control apparatus for a fuel burning space heater having a fuel supply line, a solenoid operated valve for controlling the fuel flow through said supply line, said solenoid valve stopping flow of fuel or permitting free flow depending upon whether or not it is energized, a modulating valve for controlling the rate of fuel flow through said supply line, a device responsive to the temperature of the space to be heated and connected to said modulating valve for gradually decreasing the rate of fuel flow as the ambient temperature in the space being heated increases, means operated by said temperature responsive device to cause deenergization of said solenoid valve when a predetermined temperature is exceeded and to cause energization of said valve only after a temperature substantially lower than said predetermined temperature is attained, said last named means including a two position switch in circuit with the solenoid of the solenoid operated valve operated by said temperature responsive device, and means for yieldingly holding the switch in either of its two positions, said switch arresting operation of said modulating valve in a closing direction as the predetermined temperature is approached.

CHARLES W. KLUG.

REFERENCES CITED

The following references are of record in the file of this patent:

UNITED STATES PATENTS

| Number | Name | Date |
|---|---|---|
| 2,076,768 | Denison | Apr. 13, 1937 |
| 2,096,502 | Wetzel | Oct. 19, 1937 |
| 2,253,866 | Quoos | Aug. 26, 1941 |
| 2,292,830 | Gauger et al. | Aug. 11, 1942 |
| 2,312,353 | Miller | Mar. 2, 1943 |
| 2,331,476 | Jones | Oct. 12, 1943 |